March 11, 1952          R. E. WILLIAMS          2,588,680
ELECTRONIC TONE GENERATOR Filed Feb. 3, 1949          3 Sheets-Sheet 1

INVENTOR
Richard E. Williams
BY
Bean, Brooks, Buckley & Bean
ATTORNEYS

March 11, 1952   R. E. WILLIAMS   2,588,680
ELECTRONIC TONE GENERATOR
Filed Feb. 3, 1949   3 Sheets-Sheet 3
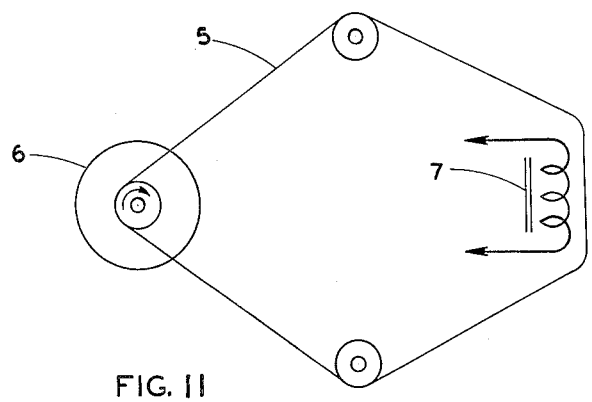
FIG. 11
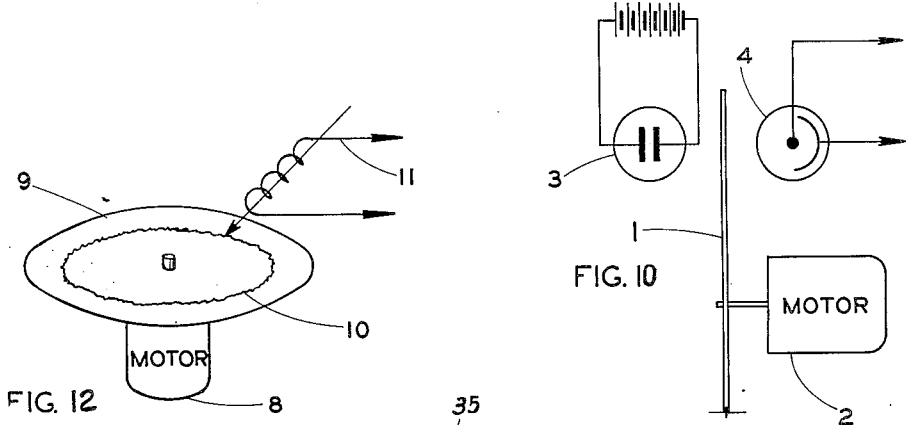
FIG. 12
FIG. 10
FIG. 9
INVENTOR
Richard E. Williams
BY
Bean, Brooks, Buckley & Bean.
ATTORNEYS Patented Mar. 11, 1952

2,588,680

UNITED STATES PATENT OFFICE 2,588,680

ELECTRONIC TONE GENERATOR

Richard E. Williams, Manchester, N. H., assignor to Wilbespan Research Labs, Inc., Manchester, N. H.

Application February 3, 1949, Serial No. 74,388

16 Claims. (Cl. 84—1.18)

1

This invention relates to improvements in electronic tone generators generally, and more particularly to improvements in electronic tone generators of the type described in detail in my United States Patent Application, Serial No. 44,697, filed August 17, 1948.

This type of musical instrument comprises in effect a fixed light source separated from a light cell by a moving screen having a light modifying function. The nature of this screen, or soundtrack disc, determines the nature of the voltage produced by the cell. This voltage in turn is transduced to sound by suitable means, producing tones singly or in combinations.

Electronic tone generators, as described above, provide satisfactory low-cost operation with a great variety of tonal colors limited only by the number of soundtrack discs available. By the present invention, greater accuracy of pitch, clearer production of tones, additional enhancing effects, and more trouble-free operation are obtained.

An object of the present invention is to provide a musical instrument of the semi-mechanical type in which inherent variations in speed of rotating members are utilized as pleasing, rather than distracting, audible effects.

Another object is a method of soundtrack recording which makes possible a higher disc speed, and therefore a higher light storage index for the pitch generating mechanism.

Further, the invention has for its object means for removing the clicks heard as a result of scanning the start-end spot on a circular soundtrack.

Again, the invention will be found to reside in a simplified and rapid method of recording the above-mentioned soundtracks.

The foregoing and other objects will manifest themselves as the following description progresses, references being had to the accompanying drawings, in which.

2

Figure 7:
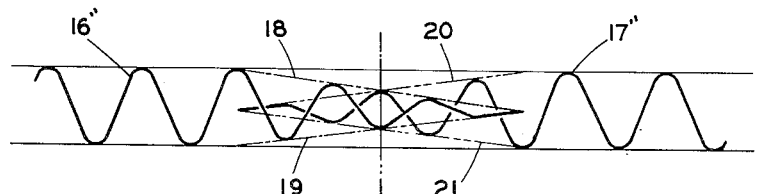
Fig. 7 is a damped overlap of the condition shown in Fig. 6.
Figure 8:
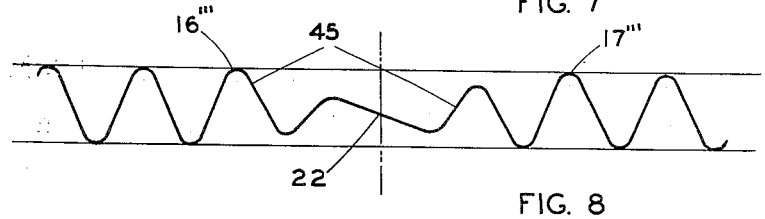

Fig. 8 is the additive equivalent of Fig. 7;

Fig. 9 is a typical disc-driving gear train;

Fig. 10 is a disc scanning device; and

Figs. 11 and 12 are additional methods of obtaining endless soundtracks.

More particularly referring to Fig. 10, a light screen 1, driven by motor 2, revolves between a light source 3 and a photoelectric cell 4. The light screen 1 has imprinted upon it by suitable means a series of soundtracks which effectively vary the amount of light traveling from light source 3 to photoelectric cell 4. The soundtracks imprinted upon this light screen are circular in shape and, therefore, may be considered endless. The present invention, in effect, minimizes detrimental effects in the sound output caused by any inherent flaws in this soundtrack.

It is to be understood that the endless soundtrack may occur in other manners, illustrated embodiments of which are shown in Figs. 11 and 12. In Fig. 11, a magnetized wire or tape 5 is driven by suitable means, such as a motor 6, past a magnetic pickup head 7, the soundtrack in this case occurring in the form of residual magnetic flux density on the wire or tape 5.

Another embodiment of the endless soundtrack principle is shown in Fig. 12 where a motor 8 drives a phonograph record 9 upon which is impressed an endless soundtrack 10. In this case, the waveform impressed upon the soundtrack is scanned by suitable means such as a pickup 11.

Figure 1:
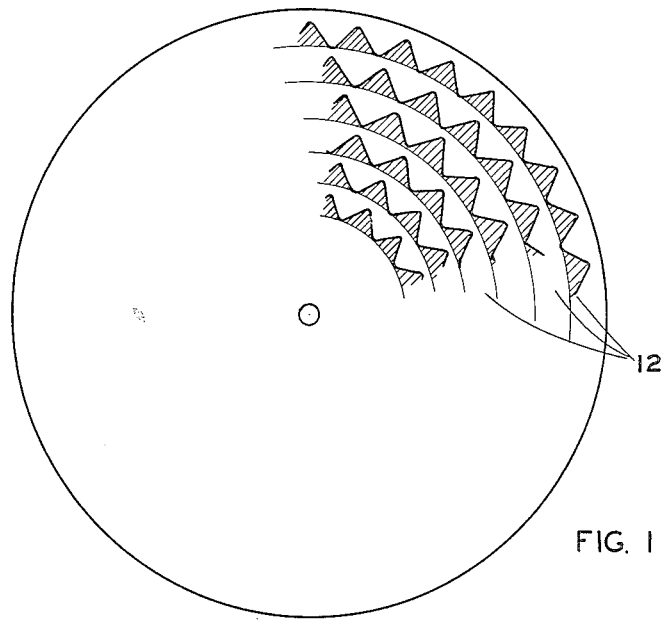
Fig. 1 is a simplified front view of a disc, showing typical soundtrack locations.

Returning to Fig. 10, the light screen 1 may have imprinted on it a plurality of soundtracks shown as 12 in Fig. 1. These soundtracks may be of the variable area type 13 in Fig. 2 or the variable density type 14 in Fig. 3. Effectively, either of these tracks periodically varies the amount of light flux transmitted from the light source 3 in Fig. 10 to the photoelectric cell 4.

Figure 2:
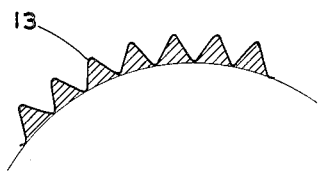
Fig. 2 is a closeup view of a variable area soundtrack.
Figure 3:
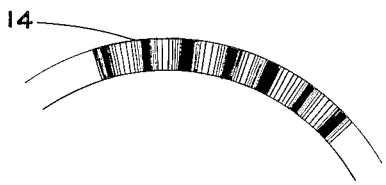
Fig. 3 is a closeup view of a variable density soundtrack.
Figure 4:
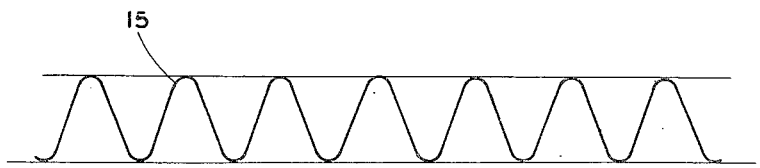
Fig. 4 is the electrical, or audible, waveform resulting from the scan of Figs. 2 or 3.

Because a sine wave is shown as the modulation on track 12 in Fig. 1, 13 in Fig. 2, or 14 in Fig. 3, the electrical voltage generated by the photoelectric cell, which is proportionate to the light received, will transcribe a sine wave 15 as shown in Fig. 4. Although a sine wave will be used for purposes of analysis, it is to be understood that any complex periodic waveform will react in essentially the same manner as is described for this type of waveform.

Figure 5:
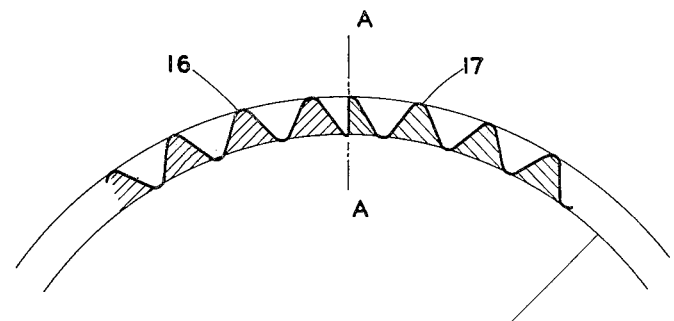
Fig. 5 is a typical start-end spot on a soundtrack.
Figure 6:
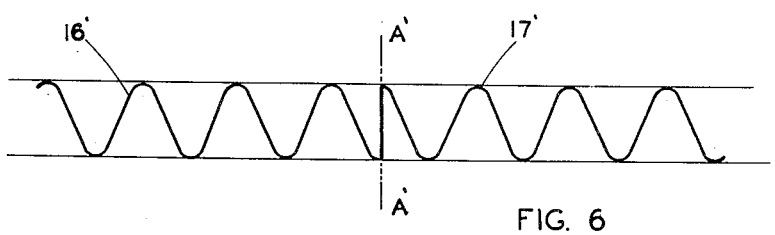
Fig. 6 is the electrical, or audible, equivalent of Fig. 5.

Although the soundtracks 12 shown in Fig. 1 may be considered endless, their generation must occur with a commencement at a spot and cessation at a spot. Because the number of cycles in a soundtrack is determined by the pitch of tone desired, it is entirely possible for a condition illustrated in Fig. 5 to occur. Assuming clockwise rotation of the track, the modulation on the track can be assumed beginning at line A—A and progressing as waveform 16. After one complete revolution, we return to spot A—A to find that the end of the track 17 intercepts the start of the track at a phase shift of 180°. Upon playback and conversion into sound energy, which may be accomplished in the usual electrical manner, this phase shift, occurring at line A—A in Fig. 5, will manifest itself in the form of a very distracting click. The electrical or audible waveform equivalent to the soundtrack shown in Fig. 5 is illustrated as 16' in Fig. 6. The click, which is of a high frequency nature, occurs at line A'—A'.

The method by which this condition has been eliminated prior to this time is the operation of the soundtrack at a very slow speed. The human ear can detect pitch variations in the order of .03%, so it will not discern any dissonance as a result of pitch (cycles per unit length) modification, provided the change to cause "in phase" return of the soundtrack does not involve more than that percentage of variation. If a sufficient number of cycles appear in an endless soundtrack, as would be the case where a very slow speed is used, this condition can be met.

Unfortunately, a speed sufficiently slow, as described, will not permit the use of one disc for all pitches, because the scanning aperture would have to be so small in such a case that physical and electrical requirements could not be met. In soundtrack phraseology, the "light storage index" is too small.

A method of soundtrack generation which effectively eliminates this undesirable click, enables the use of a single disc, and provides a high light storage index as illustrated in Fig. 7. In this case, commencement of the soundtrack 16" occurs not in an abrupt manner but as a gradual rise, indicated by lines 18 and 19. After a complete revolution, the returning waveform 17" is caused to slowly diminish in amplitude, outlined by lines 20 and 21. The ear will effectively hear the instantaneous summation of the waveforms recorded, so will, therefore, hear a waveform equivalent to that shown as 45 in Fig. 8; this waveform being the algebraic summation of the waveform shown in Fig. 7.

It will be noted by the waveform 45 that no abrupt phase reversal is apparent, although actually such a reversal is effected through the use of a slow decline, bringing the completely modulated sine wave 17''' to a null or zero point 22 which, in turn, is followed by a slow increase in amplitude to full modulation of the waveform 16'''.

As the start and end of the soundtrack inherently approach phase coincidence, the cancelation becomes less, and the point of minimum signal 22 more nearly approaches the high level value. With perfect coincidence no variation in signal level will be observed as no cancelation is effected.

Sound tracks embodying the teachings of the present invention may be manufactured, for example, in accordance with the teachings of my co-pending application, Serial No. 157,390, filed April 21, 1950, wherein suitable apparatus and methods of manufacture are described and claimed.

It is to be understood that changes in amplitude can be effected through variations in exposure in the case of photographic recording as well as variations of actual modulating energy. Anything which will diminsh the percentage of light flux variation will effectively decrease the amplitude of the recorded waveform. As the rise and fall in overlapped position is slower than optimum value, culminative wave formation will result in harmonic distortion. Because the distortion is harmonic in nature it merely destroys the tone quality of the soundtrack, but does not cause any dissonance in the case of a single tone.

In the case of phonographic recording, an actual overlap cannot occur without causing overcutting of a stylus groove. In such a case it is necessary to actually record the waveform condition shown in Fig. 8. In this case, the amplitude is dropped to a zero condition at the point where phase shift occurs and then returns to a normal operating level in a gradual manner.

In the case of a magnetic soundtrack, an overlap can be utilized with simultaneous reduction in bias and signal amplitude.

An improvement which results in minimization of possible cyclic distracting effects caused by the gradual decrease-increase effect described is embodied in the illustration of Fig. 9. In order to understand the advantage of the method to be described, it is necessary to realize that relatively slow amplitude and frequency variations of any given tone are considered distracting and undesirable unless they occur at a predetermined rate of between 4 and 12 cycles per second, which is commonly referred to as the vibrato range. In modern music, in particular, an intentional cyclic variation in frequency, amplitude, or both at a vibrato rate is inserted into musical passages by either the musician or the instrument manufacturer.

It can be realized that if inherent amplitude variations, such as the start-end effect described above, can be made to occur at a natural vibrato rate, their effect will be of an enhancing rather than distracting nature. In the case of an endless soundtrack, a method of insuring this time relationship of start-end spots is merely to operate the endless soundtrack in such a manner that a given spot will be scanned at the abovementioned vibrato rate. In other words, a given spot in the track must return to its original position at intervals varying from 4 to 12 times a second. A simple method of accomplishing this in the case of a circular light screen is shown in Fig. 9. In this case, a rotating drive shaft 33 is caused to revolve an idler 34 whose periphery, in turn, contacts a drum or gear 35 fixedly attached to the spindle 36 which carries the disk or light screen. Assuming the drive shaft 33 to revolve at 1600 R. P. M. and the drum 35 to be 4 times the diameter of the drive shaft 33, it is seen that the drum, and, therefore, the light screen, will rotate at a speed of 400 R. P. M., corresponding to 6⅔ revolutions per second. This speed falls within the vibrato range, so would insure the fact that the start-end spot will be scanned at a natural vibrato rate.

An added advantage occurring as a result of this invention can be realized as a result of utilizing inherent eccentricities which are unavoidable in the generation of a circular member. If the drum 35 is assumed eccentric by any amount, its speed will vary above and below the desired amount approximately 6⅔ times every second which, again, is a natural vibrato rate. A variation in speed of this nature will result in variations in frequencies or pitch of the sound generated by the endless soundtrack; a higher pitch corresponding to a higher speed. Again, any unbalance in the drum 35, spindle 36, or light screen itself will result in the same frequency vibrato.

In the case of phonographic recording, the vibrato rate should be applied to the disc-supporting turntable. Any unbalance, eccentricities, etc., in said turntable will then occur in the natural vibrato rate.

In the case of magnetic sound recording, it is possible to apply this natural vibrato rate to either the cycling speed of the soundtrack or to that of any rotating member mechanically involved in sustaining the soundtrack speed.

What is claimed is:

1. In a photoelectric tone generator having a cycling light-modulating tone screen, the method of minimizing detrimental audio manifestations resulting from phase or amplitude discrepancies in the light-modulating characteristics of said tone screen and detrimental pitch characteristics resulting from cyclic speed variations of said tone screen, which comprises cycling said tone screen at such a rate that said detriments of phase, amplitude, and pitch recur at a natural vibrato rate.

2. A tone screen having an endless light modulating sound track, a signal recorded upon said sound track, said signal being attenuated in the regions of the beginning and end of its generation whereby a phase shift in the start-end region of signal generation is attenuated.

3. A tone screen having an endless light-modulating sound track, a signal recorded upon said sound track throughout slightly more than one circuit thereof to provide an overlapped start-end region having cumulative characteristics of the beginning and end of the signal generation.

4. A light modulating tone screen having an endless sound track modulated to represent a tone signal, the modulation of said track being less than one hundred per cent for each component signal in any overlapped portion of said sound track.

5. A light-modulating tone screen having an endless sound track, the waveform recorded on said track having the start-end spot merged gradually to de-emphasize any abrupt change in the waveform.

6. A photoelectric tone generator having a light source, a light sensitive cell, a light modulating screen therebetween whose cyclic speed determines tone pitch, and a cycling mass having a cycling period directly related to said cycling speed of said light modulating screen, said cycling period being determined at a natural vibrato rate.

7. A photoelectric tone generator having a light source, a light sensitive cell, and a cycling light modulating screen therebetween having an endless sound track with a cyclic amplitude variation, the cyclic velocity of said light modulating screen being made to equal a number of cycles per second equal to a natural vibrato rate.

8. A photoelectric tone generator having a light source, a light sensitive cell, and a light-modulating tone sound track therebetween driven by a rotating member, the speed of said member being made a number of revolutions per second equal to a natural vibrato rate, so that cyclic variations in said speed cause variations in tone pitch or amplitude at a natural vibrato rate.

9. A photoelectric tone generator having a light source, a light sensitive cell, a moving endless light-modulating sound track therebetween, and scanning means associated with said light source and light sensitive cell, the speed of said sound track with respect to its length being a number of lengths per second equal to a natural vibrato rate, so that scanning recurrs at a natural vibrato rate.

10. A tone screen having an endless light-modulating track sound, the waveform recorded upon said sound track being effectively overlapped at the start-end spot.

11. A tone screen having a plurality of endless light-modulating sound tracks corresponding to predetermined tones, wherein the waveforms constituting said tones are formed with reduced amplitude at proximate points having phase discrepancies resulting from non-integral relationship between the frequencies of said predetermined tones and time-length characteristics of said sound tracks.

12. The method of producing a plurality of musical pitches from a single cycling tone screen having a plurality of light-modulating sound tracks, which comprises recording exact relative pitches on said sound tracks, and cycling said tone screen relative to a screen scanning sound reproducer at a natural vibrato rate in cycles per second, thereby minimizing the resultant phase and amplitude discrepancies by causing them to recur at a natural vibrato rate.

13. In a tone generator, an endless waveform modulated sound track, the waveform modulation of said sound track having start and end termini of generation on said sound track, said termini being individually attenuated.
a d rilu2-rnaturalwook ar 14. In a tone generator, an endless waveform modulated sound track, a modulation terminal portion of said sound track including the start-end region of primary modulation generation thereon, the modulation of said terminal portion comprising components derived from the start and end portions of said primary modulation, said portions being complementingly attenuated and overlapped.

15. In a tone generator, an endless waveform modulated sound track, a modulation terminal portion of said sound track including the start-end region of primary modulation generation thereon, the modulation of said terminal portion comprising components derived from the start and end portions of said primary modulation, said portions being complementingly attenuated and overlapped, and driving mechanism adapted to cycle said sound track at a vibrato rate.

16. In a photoelectric tone generator having a cycling light-modulating tone screen, the method of minimizing detrimental audio manifestations resulting from abrupt phase shift at the start-end portion of the screen sound track comprising preparing the sound track with a modified start-end portion having distortions from the original signal devoid of high order discontinuity produced harmonics, and cycling said tone screen at a natural vibrato rate.

RICHARD E. WILLIAMS.

REFERENCES CITED

The following references are of record in the file of this patent:

UNITED STATES PATENTS

| Number | Name | Date |
|---|---|---|
| 1,941,036 | Lenk | Dec. 26, 1933 |
| 1,967,239 | Hardy | July 24, 1934 |
| 2,454,367 | Artzt | Nov. 23, 1948 |
| 2,471,534 | Muth et al. | May 31, 1949 |